United States Patent
Uchida et al.

(10) Patent No.: US 6,374,885 B1
(45) Date of Patent: Apr. 23, 2002

(54) STUDLESS TIRE INCLUDING ORIENTED SHORT FIBERS

(75) Inventors: Mamoru Uchida, Akashi; Hidehiko Hino, Amagasaki; Narihiro Tahara, Akashi; Shinichi Miyazaki, Kobe, all of (JP)

(73) Assignee: Sumitomo Rubber Industries, Ltd.

( * ) Notice: Subject to any disclaimer, the term of this patent is extended or adjusted under 35 U.S.C. 154(b) by 0 days.

(21) Appl. No.: 09/450,660

(22) Filed: Nov. 30, 1999

(30) Foreign Application Priority Data

Dec. 2, 1998 (JP) ............................................ 10-343283

(51) Int. Cl.$^7$ ........................... B60C 9/12; B60C 11/11; B60C 11/12; B60C 107/00
(52) U.S. Cl. ................ 152/209.4; 152/209.18; 152/458; 152/902; 152/DIG. 3
(58) Field of Search .................. 152/209.4, 209.18, 152/DIG. 3, 212, 902, 458

(56) References Cited

U.S. PATENT DOCUMENTS

| | | | |
|---|---|---|---|
| 2,756,460 A | * | 7/1956 | Heintz |
| 5,605,588 A | * | 2/1997 | Hatakenaka et al. ... 152/DIG. 3 |
| 5,833,779 A | * | 11/1998 | van der Meer et al. ... 152/DIG. 3 |
| 5,975,173 A | * | 11/1999 | Izumoto et al. ......... 152/209.18 |
| 6,000,450 A | * | 12/1999 | Kishimoto et al. .... 152/DIG. 3 |

FOREIGN PATENT DOCUMENTS

| | | | | |
|---|---|---|---|---|
| CA | 2049784 | * | 3/1992 | ............. 152/209.4 |
| DE | 4128613 A1 | | 3/1992 | |
| EP | 0681073 | | 11/1995 | |
| EP | 826522 | * | 3/1998 | |
| JP | 61-119409 | * | 6/1986 | ............. 152/209.4 |
| JP | 62-191204 | * | 8/1987 | ............. 152/209.4 |
| JP | 2-274602 | * | 11/1990 | ............. 152/209.4 |
| JP | B2 2637887 | | 4/1997 | |
| JP | 09193618 | | 7/1997 | |
| JP | 09323507 | | 12/1997 | |
| JP | 10129214 | | 5/1998 | |
| JP | 11-77695 | * | 3/1999 | ............. 152/209.4 |

* cited by examiner

Primary Examiner—Steven D. Maki
(74) Attorney, Agent, or Firm—Birch, Stewart, Kolasch & Birch, LLP

(57) ABSTRACT

A studless tire contains tread portion made of vulcanized rubber, compounded from 100 parts by weight of rubber and 2 to 30 parts by weight of short fibers, and the tread portion has a ground connecting region with sipes, formed by pressing thin plates onto the tread rubber during vulcanizing, whereby the thin plates orient the short fibers in a radial direction. Preferably, the short fibers have a diameter of not more than 30 $\mu$m and a length of from 0.3 to 20 nm, and the thickness of the thin plates or the width of the sipes ranges from 0.2 to 0.5 mm with spacings being sipes less than 10 mm. The short fibers are circumferentially oriented before pressing the thin plates, and the total length in mm of axial component of all sipes ranges from 0.05 to 0.15 times the area in mm$^2$ of ground contacting region.

2 Claims, 4 Drawing Sheets

STUDLESS TIRE INCLUDING ORIENTED SHORT FIBERS

BACKGROUND OF THE INVENTION

The present invention relates to a pneumatic tire, more particularly to a studless tire improved in wet grip performance.

In recent years, studless tires or winter tires having no spike have come in to wide use.

DESCRIPTION OF THE RELATED ART

In Japanese Patent No. 2637887, a rubber compound including organic fibers which is suitably used in the studless tires as tread rubber is disclosed, wherein, in order that the fibers are not oriented in a specific direction during extruding the raw compound, the organic fibers have a diameter of 0.1 to 0.3 mm and a length of 0.5 to 3 mm and the ratio of the diameter to the length is set in the range of from 0.06 to 0.6. And the content of the fibers is set in the range of from 5 to 20 parts by weight with respect to 100 parts by weight of material rubber compound. Therefore, in the tread portion of the finished tire, the fibers are not oriented in a specific direction and the tire tread rubber do not display directional characteristics.

In order to improve wet grip performance, especially on the ice covered road, of the above-mentioned studless tires, the present inventors studied and found that the road grip becomes maximum when all the fibers are oriented in the tire radial direction.

SUMMARY OF THE INVENTION

It is therefore an object of the present invention to provide a studless tire in which the tread rubber in the ground contacting region contains short fibers oriented in the radial direction of the tire.

According to the present invention, a studless tire comprises a tread portion,
the tread portion made of a vulcanized tread rubber,
the tread rubber compounded from 100 parts by weight of rubber component and 2 to 30 parts by weight of short fibers,
the tread portion provided in a ground contacting region with sipes
the sipes being formed by pressing thin plates onto the tread rubber during vulcanizing the tread rubber, whereby the thin plates orient the short fibers in a radial direction of the tire.

Preferably, the short fibers have a diameter of not more than 30 μm and a length of from 0.3 to 20 mm, and the thickness of the thin plates or the width of the sipes is in the range of from 0.2 to 0.5 mm. The spacings between the sipes are less than 10 mm.

Further, the short fibers are generally oriented in the circumferential direction of the tire before pressing the thin plates, and the total length in millimeter of axial component of all the sipes being in the range of from 0.05 to 0.15 times the area in square millimeter of the ground contacting region.

An embodiment of the present invention will now be described in detail in conjunction with the accompanying drawings.

DETAILED DESCRIPTION OF THE INVENTION

Figure 1:
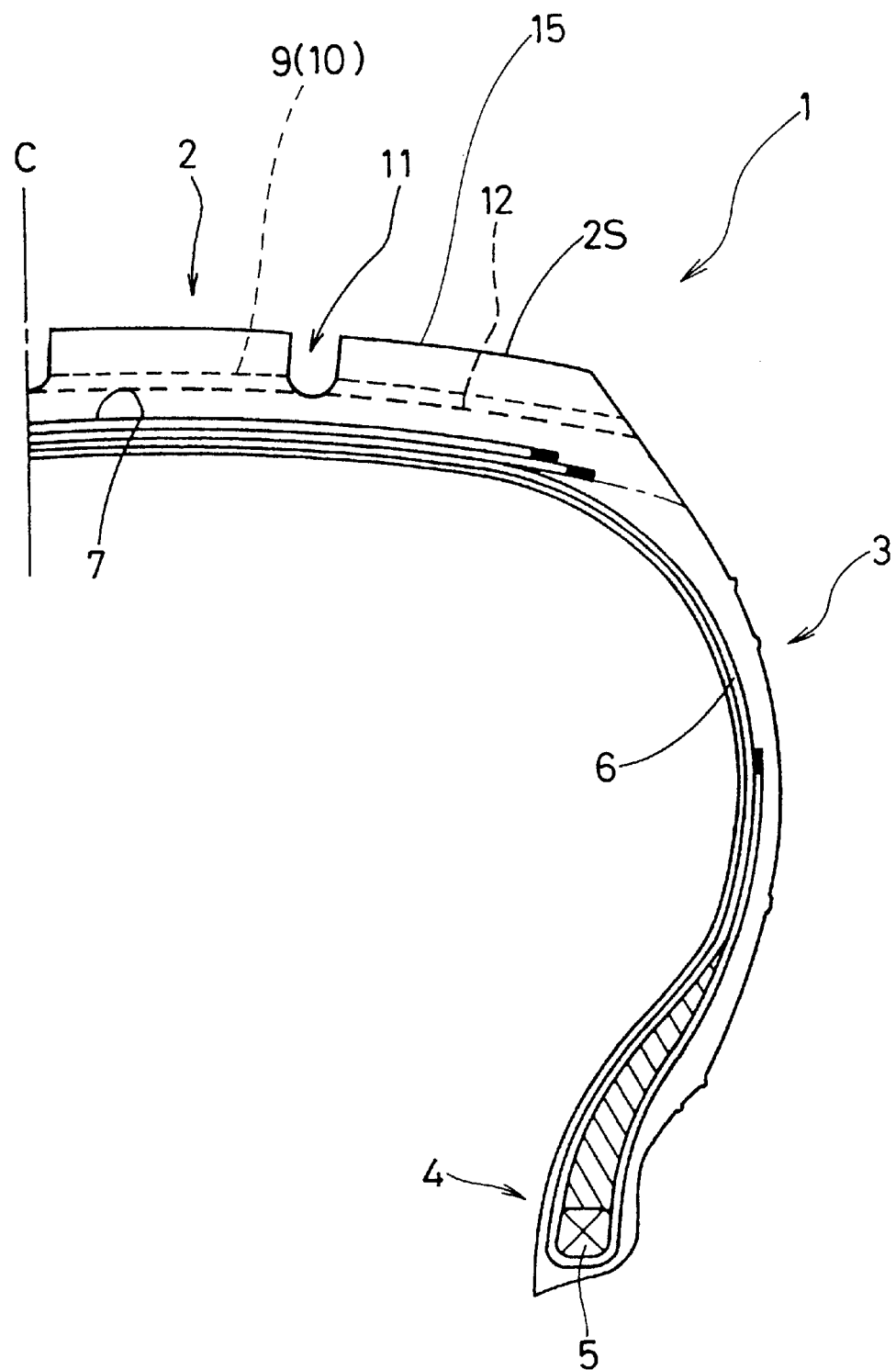
FIG. 1 is a cross sectional view of an embodiment of the present invention.

In the drawings, the studless tire 1 according to the present invention comprises a tread portion 2, a pair of sidewall portions 3, a pair of axially spaced bead portions 4 with a bead core 5 therein, a carcass 6 extending between the bead portions, and a belt 7 disposed radially outside the carcass in the tread portion.

The carcass 6 comprises at least one ply of cords arranged at an angle of from 75 to 90 degrees with respect to the tire equator C.

The belt 7 comprises at least two cross plies of parallel cords laid at angle of from 10 to 30 degrees with respect to the tire equator C. In this embodiment, the belt 7 is composed of two plies of high modulus cords such as steel cords.

The tread portion 2 is provided with tread grooves 10 to form a tread pattern such as a block pattern, rib-block pattern and the like including blocks 13, 14.

Figure 2:
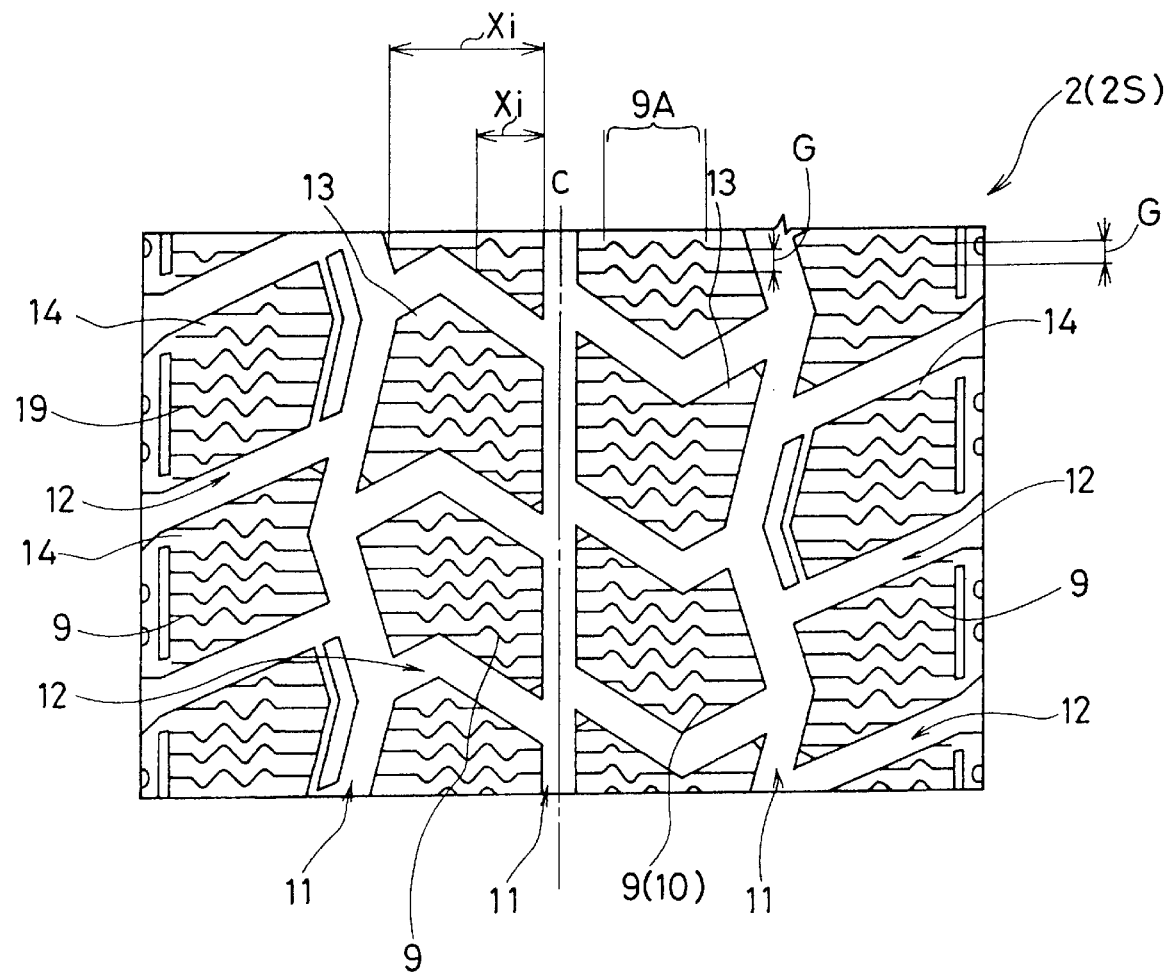
FIG. 2 is a developed view showing the tread pattern thereof.

In this embodiment, the tread grooves 10 include a plurality of circumferential grooves 11 extending continuously in the tire circumferential direction, and a plurality of axial grooves 12 intersecting the circumferential grooves 11. In FIG. 2, the tread portion 2 is divided into blocks 13 and 14 in four circumferential rows, defining a block pattern.

Each of the blocks 13 and 14 is provided with a plurality of sipes 9 generally extending in the tire axial direction.

In this example, most of the sipes 9 are zigzagged partially in the middle of the blocks in the tire axial direction in order to increase the length and to provide not only an axial component but also a circumferential component to improve wet grip performance in the circumferential direction and axial direction of the tire.

In FIG. 2, both the ends of each sipe 9 are opened to adjacent grooves. But, it may be possible to use a sipe of which one end is opened and the other end is closed, and a sipe of which both ends are closed, either solely or in combination.

The sipes 9 are arranged at substantially regular intervals G in the tire circumferential direction.

The tread portion 2 is made of a tread rubber 15 containing 2 to 30 parts by weight, preferably not more than 20 parts by weight of short fibers F with respect to 100 parts by weight of the rubber component.

For the rubber component, various rubber-like elastic materials may be used. Usually, at least one kind of diene rubber selected from natural rubber (NR), isoprene rubber (IR), butadiene rubber (BR), styrene-butadiene rubber (SBR) and the like is used.

Further, various additives are blended, for example: vulcanizing agent such as sulfur; coagent such as zinc oxide and stearic acid; accelerator such as thiazole accelerator, e.g. mercaptobenzothiazole (MBT) and dibenzothiazyl disulfide (MBTS) and sulfenamide accelerator, e.g. N-tert-ptyl-2-benzothiazyl sulfenamide (TBBS) and N-cyclohexyl-2-benzothiazyl sulfenamide (CBS); softener such as naphthenic oil, paraffinic oil and aromatic oil; reinforcing agent such as carbon black and silica; age resistor; wax; coupling agent; and the like.

The diameter of the short fibers F is not more than 30 μm, preferably not more than 20 μm, but not less than 5 μm, preferably not less than 10 μm.

The length of the short fibers F is not less than 0.3 mm, preferably not less than 0.4 mm, more preferably not less than 5 mm, but not more than 20 mm, preferably not more than 10 mm.

The tire in this invention can be manufactured using a vulcanizing mold as usual, and the tread portion 2 is formed by winding a strip 21 of raw tread rubber 15 around the carcass 6. As explained above, the raw tread rubber 15 is compounded from the above-mentioned various materials which are mixed by a mixer such as banbury mixer, rolls or the like.

Figure 3:
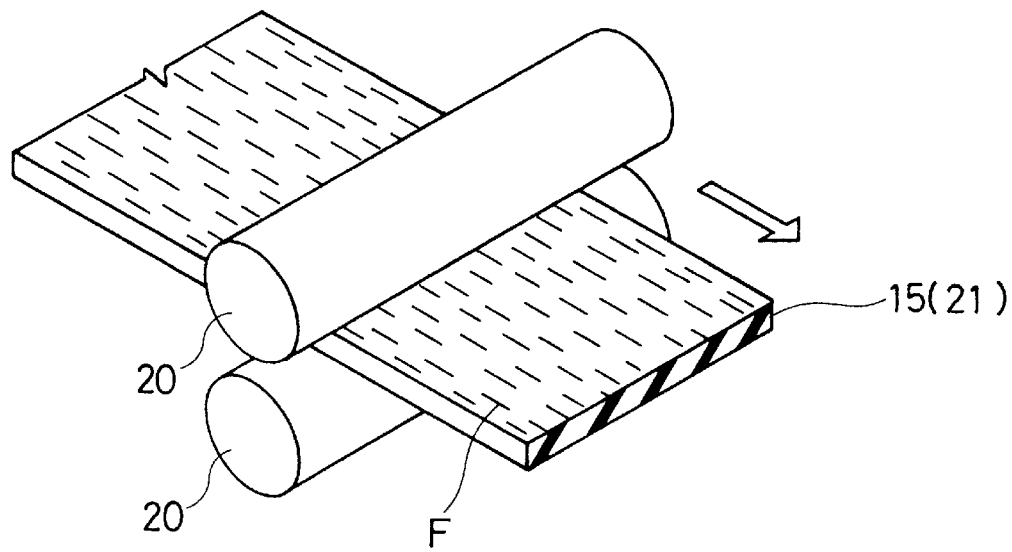
FIG. 3 is a diagram for explaining a step of making a tread rubber strip.

The tread rubber strip 21 is formed by extruding or rolling the raw tread rubber 15 as shown in FIG. 3. By rolling or extruding the raw rubber, the short fibers therein are oriented in the longitudinal direction of the strip. In FIG. 3, calender rolls 20 are used. Thus, when the strip 21 is wound around the carcass 6, the short fibers are oriented in the circumferential direction of the tire.

Figure 5:
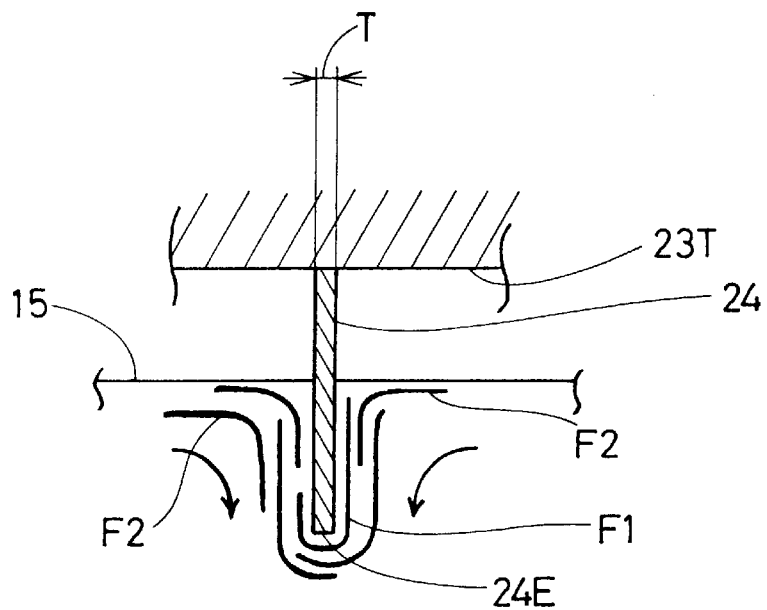
FIG. 5 is a diagram for explaining how the short fibers are oriented by a plates.
Figure 4:
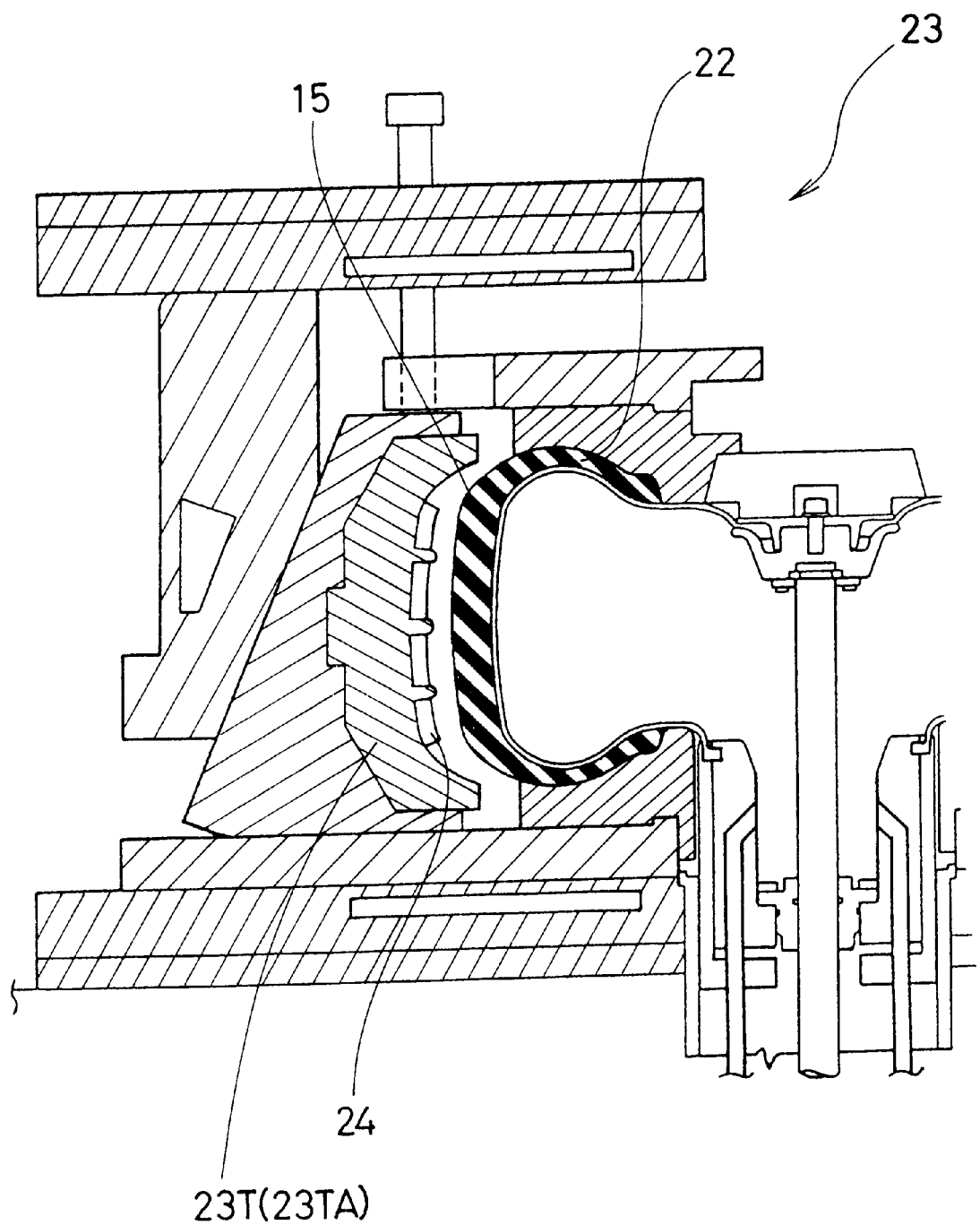
FIG. 4 is a cross sectional view for explaining a step of making the tire.

Next, to vulcanize the raw tire 22, it is put into the mold 23 as shown in FIG. 4. In this example, the mold 23 is a segmental mold comprising sectors 23T for molding the tread portion 2. The sectors 23T are movable in the tire radial direction towards the tire, and the radially inside thereof is provided with thin plates 24 for forming the sipes. By moving the sectors 23T towards the tire, the thin plates 24 are pressed onto the surface of the raw tread rubber strip and inserted in the tread rubber. As a result, the sipes 9 are formed, and at the same time, the short fibers F are oriented as shown in FIG. 5.

During inserting the plates 24, short fibers F1 therearound are caught by the radially inner edges 24E of the plates 24, and pulled toward the radially inside, and short fibers F2 positioned near the short fibers F1 are also drawn towards the radially inside. As a result, the short fibers near the sipes 9 are almost oriented in the radial direction.

In order that the short fibers F are efficiently oriented, it is important that the length of the short fibers F is set in the range of from 0.3 to 20 mm, and the diameter thereof is set in the range of not more than 30 μm. If the length of the short fibers F is less than 0.3 mm, the short fibers F are hard to be caught by the radially inner edges 24E, and thus it is difficult to orient them in the radial direction. If more than 20 mm, processing characteristics of the raw tread rubber become lowered, and a rubber flow during vulcanizing the tire becomes worse, and the above-mentioned motion of the fibers F2 accompanying the pulled fibers F1 is hindered.

It is also necessary for efficiently orienting the short fibers F1 to set the thickness T of the plates 24 within the range of from 0.2 to 0.5 mm. If the thickness T exceeds 0.5 mm, it is difficult to orient the short fibers F. If the thickness T is less than 0.2 mm, the strength of the plates 24 is decreased, and it is difficult to make or maintain the tire vulcanizing mold 23.

By using such thin plates 24, it becomes possible to orient the short fibers existing within a range of about 5 mm from the plates or sipes.

Therefore, in order to orient almost all the fibers, the sipes are preferably arranged at intervals G of less than 10 mm (5 mm×2).

Further, it is preferable that the total length $\Sigma Xi$ (mm) of the axial components Xi of the respective sipes 9 is set in the range of from 0.05 to 0.15 times the gross area SS (mm 2) of the tread face 2S.

If the diameter of the short fibers F is more than 30 μm, the short fibers F are hard to twine around the radially inner edges 24E, and thus it is difficult to orient the fibers in the radial direction. Further, the tread rubber 15 becomes hard and adhesion with the road surface decreases. If the diameter is less than 5 μm, the fibers lose a minimum bending rigidity required for scratching the road surface.

If the amount of the short fibers F is less than 2 parts by weight, the road surface scratching effect becomes insufficient. If more than 30 parts by weight, the wear resistance of the tread rubber decreases.

If the ratio $\Sigma Xi/SS$ is less than 0.05, it becomes difficult to obtain a necessary on-the-ice performance. If more than 0.15, the tread rigidity is excessively decreased, and uneven wear resistance and maneuverability on dry roads decrease.

For the short fibers F, glass fiber, aluminum whisker, organic fibers, e.g. polyester, nylon, vinylon, aromatic polyamide and the like can be used. But, for the dispersion during mixing, the prevention of softening or stiffening, and the road surface scratching effect, inorganic materials having a specific gravity in the range of not less than 2.0, such as glass fiber and aluminum whisker are preferably used. From a viewpoint of orientation, it is especially preferable that the length/diameter ratio of the short fibers F is not less than 30.

Comparison Tests: Test tires of size 185/65R14 (Rim size: 14×5.5JJ) having the tire structure and tread pattern shown in FIGS. 1 and 2 were made according to the specifications given in Table 1 and tested for on-the-ice performance, wear resistance, uneven wear resistance and maneuverability.

On-the-ice performance test: In the test, a test car, 2000 cc FF passenger car provided on all the four wheels with the test tires (Inner pressure: 200 Kpa) was run on an ice-covered road at a speed of 30 km/h, and a sharp braking was made to obtain the braking distance and the average braking deceleration. The results are indicated by an index based on the reference tire 1 being 100, wherein the larger the index, the better the performance.

Uneven wear resistance test: After the test car run 5000 km on a dry asphalt road in a tire test course, the difference in the amount of wear was evaluated around the sipes. The results are indicated by an index based on the reference tire 1 being 100. The lager the index, the better the uneven wear resistance.

Maneuverability test: Running the passenger car on a dry asphalt paved 8-shaped course (25 meter radius), the lap time was measured. The results are indicated by an index based on the reference tire 1 being 100. The large the index, the better the maneuverability.

Wear resistance test: Using a Lambourn type wear tester, the wear resistance was measured under the following conditions. Load: 2 kg, Slip rate: 30%, Time: two minutes The amount of wear is indicated by an index based on the Example tire 1 being 100. The larger the index, the better the wear resistance.

TABLE 1

| Tire | Ex. | Ref. 1 | Ref. 2 | Ref. 3 | Ref. 4 | Ref. 5 | Ref. 6 | Ref. 7 |
|---|---|---|---|---|---|---|---|---|
| Tread rubber | B | A | B | B | C | D | E | F |
| $\Sigma Xi/SS$ | 0.1 | 0.1 | 0.04 | 0.17 | 0.1 | 0.1 | 0.1 | 0.1 |

TABLE 1-continued

| Tire | Ex. | Ref. 1 | Ref. 2 | Ref. 3 | Ref. 4 | Ref. 5 | Ref. 6 | Ref. 7 |
|---|---|---|---|---|---|---|---|---|
| Ice performance | 121 | 100 | 95 | 101 | 111 | 119 | 113 | 105 |
| Uneven wear resistance | 100 | 100 | 100 | 89 | 100 | 100 | 100 | 100 |
| Wear resistance | 100 | — | — | — | 102 | 80 | 98 | 102 |
| Maneuverability | 101 | 100 | 102 | 95 | 104 | 104 | 97 | 101 |

TABLE 2

| Rubber | A | B | C | D | E | F |
|---|---|---|---|---|---|---|
| Glass fiber | | | | | parts by weight | |
| Dia. (μm) | — | 9 | 9 | 9 | 35 | 9 |
| Length (mm) | — | 13 | 25 | 13 | 15 | 0.2 |
| Rubber component | | | | | | |
| NR | 60 | 60 | 60 | 60 | 60 | 60 |
| BR | 40 | 40 | 40 | 40 | 40 | 40 |
| Carbon black (N220) | 30 | 30 | 30 | 30 | 30 | 30 |
| Silica (VN3) | 20 | 20 | 20 | 20 | 20 | 20 |
| Paraffinic oil | 15 | 15 | 15 | 15 | 15 | 15 |
| Silane coupling agents (S169) | 2 | 2 | 2 | 2 | 2 | 2 |
| Paraffinic wax | 2 | 2 | 2 | 2 | 2 | 2 |
| Age resistor (6PPD) | 2 | 2 | 2 | 2 | 2 | 2 |
| Stearic acid | 2 | 2 | 2 | 2 | 2 | 2 |
| Hydrozincite | 3 | 3 | 3 | 3 | 3 | 3 |
| Sulfur | 1.5 | 2 | 2 | 2 | 2 | 1.5 |
| Accelerator (CZ) | 1 | 1 | 1 | 1 | 1 | 1 |
| Accelerator (DPG) | 0.8 | 1 | 1 | 1 | 1 | 0.8 |

In the reference tires 2 and 7, the short fibers were hardly oriented. In the reference tire 3, the rigidity of the tread portion became insufficient. In the reference tire 4, the degree of orientation becomes not good due to the decreased rubber flow. In the reference tire 5, the wear resistance was greatly decreased due to too much short fibers. In the reference tire 6, the orientation was not good and the tread rubber became too hard to provide a good adhesion to the road surface because the short fibers were too thick.

What is claimed is:

1. A studless tire comprising a tread portion made of a vulcanized tread rubber, the tread rubber compounded from 100 parts by weight of rubber component and 2 to 30 parts by weight of short fibers, said tread portion provided in a ground contacting region with sipes, the sipes being formed by pressing thin plates onto the tread rubber during vulcanizing the tread rubber, whereby the thin plates orient the short fibers in a radial direction of the tire wherein said short fibers have a diameter of not more than 20 μm, a length of from 5 to 20 mm and an aspect ratio of not less than 30, said thin plates have a thickness in the range of from 0.2 to 0.5 mm, the spacings between the sipes are less than 10 mm, the total length in millimeters of axial component of all the sipes is in the range of from 0.05 to 0.15 times the area in square millimeters of the ground contacting region, and before pressing the thin plates, the short fibers are generally oriented in the tire circumferential direction.

2. The studless tire according to claim 1, wherein the tread portion is divided into blocks each provided with a plurality of said sipes, and the sipes include zigzag sipes having a zigzagged part in the middle of the length.

* * * * *